US008938395B2

(12) United States Patent
Willner et al.

(10) Patent No.: US 8,938,395 B2
(45) Date of Patent: *Jan. 20, 2015

(54) CURSOR PATH VECTOR ANALYSIS FOR DETECTING CLICK FRAUD

(75) Inventors: Barry E. Willner, Briarcliff Manor, NY (US); Edith H. Stern, Yorktown Heights, NY (US); Patrick J. O'Sullivan, Ballsbridge (IE); Robert C. Weir, Westford, MA (US); Sean Callanan, Churchtown (IE)

(73) Assignee: International Business Machines Corporation, Armonk, NY (US)

( * ) Notice: Subject to any disclaimer, the term of this patent is extended or adjusted under 35 U.S.C. 154(b) by 1779 days.

This patent is subject to a terminal disclaimer.

(21) Appl. No.: 11/778,140

(22) Filed: Jul. 16, 2007

(65) Prior Publication Data
US 2009/0024971 A1    Jan. 22, 2009

(51) Int. Cl.
G06Q 30/00 (2012.01)
G06Q 30/02 (2012.01)
G06F 3/01 (2006.01)
G06F 3/048 (2013.01)
H04L 29/06 (2006.01)

(52) U.S. Cl.
CPC ............ *G06Q 30/02* (2013.01); *G06Q 30/0248* (2013.01); *G06Q 30/0277* (2013.01); *G06F 3/011* (2013.01); *H04L 63/126* (2013.01)
USPC ............................................. 705/14; 715/856

(58) Field of Classification Search
CPC .............................. H04L 63/126; G06Q 30/02
USPC .............. 709/224; 345/158; 707/3; 705/1, 14
See application file for complete search history.

(56) References Cited

U.S. PATENT DOCUMENTS

| 7,523,016 | B1 * | 4/2009 | Surdulescu et al. .......... 702/185 |
| 8,380,503 | B2 * | 2/2013 | Gross ............................. 704/246 |
| 2006/0136294 | A1 | 6/2006 | Linden et al. |
| 2006/0265493 | A1 * | 11/2006 | Brindley et al. ............... 709/224 |
| 2007/0236453 | A1 * | 10/2007 | Maynard et al. ............... 345/158 |
| 2007/0255821 | A1 * | 11/2007 | Ge et al. ........................ 709/224 |

OTHER PUBLICATIONS

Definition of "Vector", WordNet 3.0, Princeton Unversity, Farlex Inc. 2003.*
http://news.bbc.co.uk/1/hi/technology/4340561.stm.

* cited by examiner

*Primary Examiner* — William A Brandenburg
(74) *Attorney, Agent, or Firm* — Moore & Van Allen PLLC

(57) ABSTRACT

A system and method for detecting click fraud where data is received corresponding to a tracking of movement of a cursor on a web page. The movement of the cursor is associated with at least one vector. The at least one vector represents at least a portion of the cursor movement. A confidence level useable in the determination of click fraud is determined. The confidence level is responsive to analysis of the at least one vector representing at least a portion of the cursor movement.

18 Claims, 8 Drawing Sheets

CURSOR PATH VECTOR ANALYSIS FOR DETECTING CLICK FRAUD

BACKGROUND OF THE INVENTION

The present invention is related to detecting click fraud, and more specifically to cursor path vector analysis for detecting click fraud.

Pay Per Click (PPC) is a market tool of the Internet and drives businesses such as Google and Yahoo. In the PPC model, an Advertiser creates clickable advertisements which a Publisher (typically an unaffiliated web site) displays on their website. The Advertiser pays the Publisher for each "click through" which a visitor to the Publisher's site generates, in essence paying for each referral. A PPC system is often extended to include Advertising Networks (e.g., Google) that coordinate the distribution of these advertisements, the charges to the Advertisers and the payments to Publishers, acting essentially as middlemen and making a profit based on the difference between what they pay the Publishers versus what they charge the Advertisers.

Click Fraud (CF) occurs when a person or organization repeatedly generates clicks to a PPC advertisement with the intent of generating an improper charge to the Advertiser. There are several parties who may have an economic motivation to commit Click Fraud.

Click Fraud is clearly unethical and is illegal in several jurisdictions. Click Fraud may be accomplished via automated scripts (clickbots) which run in distributed networks, often using zombie machines (end-user machines compromised by viruses) to simulate clicks from legitimate users. Estimates are that fraudulent clicks represent 2-20% of all clicks.

Automation tools motivate clicks on a given point on a page (which could be a button, menu entry, etc.) using instructions that position the mouse pointer at a given location, establish the identity of a control on screen (e.g., a button) and motivate a click action. Across automation tools the scripting for this action can be generalized as the following flow and sequence of instructions:

```
Handle hControl=FindWindowContol (Control, "label"); // REM
    generates a handle to a control on screen which can be a button,
    URI, etc.
WindowPos=GetWindowPosition (hControl); // REM returns the X and Y
    co-ordinates of the Window Control on screen
MoveMouse (WindowPos); // REM positions the mouse at the position on
    screen where the control/URI lives
MouseClick (WindowPos); // REM clicks on the position on screen where
    the control resides
```

A more intelligent automation script that attempts to force a mouse to traverse a set of vectors to click on a button or Uniform Resource Locator (URI) might have the following sequence:

```
Handle hControl=FindWindowControl (Control, "label") ; // REM
    generates a handle to a control on screen which can be a button,
    URI, etc.
WindowPos=GetWindowPosition (hControl) ; // REM returns the X and Y
    co-ordinates of the Window Control on screen
MoveMouse (VectorArray(array), WindowPos) ; // REM moves the mouse
    to the position on screen where the control /URI lives forcing the
    mouse to traverse a set of vectors
MouseClick (WindowPos) ; // REM clicks on the position on screen where
    the control resides
```

BRIEF SUMMARY OF THE INVENTION

According to one aspect of the present invention, a method for detecting click fraud includes tracking the movement of a cursor on a web page prior to an advertisement on the web page being clicked by a controller of the cursor, the tracking being performed by a server hosting the web page, and mapping a path taken by the movement of the cursor to at least one vector associated with the path by the server, the at least one vector being useable to detect a click fraud.

According to another aspect of the present invention, a server includes a storage device and a processing device. The storage device hosts a web page containing an advertisement. The processing device controls providing the advertisement on the web page, tracking the movement of a cursor on the web page prior to the advertisement on the web page being clicked by a controller of the cursor, and mapping a path taken by the movement of the cursor to at least one vector associated with the path. The at least one vector is useable to detect a click fraud.

According to a further aspect of the present invention, a computer program product comprising a computer useable medium having computer useable program code embodied therewith, the computer useable program code comprising computer useable program code configured to track the movement of a cursor on a web page prior to an advertisement on the web page being clicked by a controller of the cursor, the tracking being performed by a server hosting the web page, and computer useable program code configured to map a path taken by the movement of the cursor to at least one vector associated with the path by the server, the at least one vector being useable to detect a click fraud.

According to still another aspect of the present invention, a method for detecting click fraud includes tracking the movement of a cursor on a web page prior to an advertisement on the web page being clicked by a controller of the cursor, the tracking being performed by client code on a client device displaying the web page, and mapping a path taken by the movement of the cursor to at least one vector associated with the path by the browser. The at least one vector is useable to detect a click fraud.

According to another aspect of the present invention, a device includes an input interface and a browser. The input interface accesses a web page containing an advertisement. Client code on the device tracks the movement of a cursor on the web page prior to the advertisement on the web page being clicked by a controller of the cursor, and maps a path taken by the movement of the cursor to at least one vector associated with the path. The at least one vector is useable to detect a click fraud.

According to a further aspect of the present invention, a computer program product comprising a computer useable medium having computer useable program code embodied therewith, the computer useable program code comprising computer useable program code configured to track the movement of a cursor on a web page prior to an advertisement on the web page being clicked by a controller of the cursor, and computer useable program code configured to map a path taken by the movement of the cursor to at least one vector associated with the path by the browser, the at least one vector being useable to detect a click fraud.

According to still another aspect of the present invention, a method for detecting click fraud includes receiving data related to at least one vector associated with a path taken by movement of a cursor on a web page prior to an advertisement on the web page being clicked by a controller of the cursor, and detecting a click fraud based on an analysis of the received data.

According to another aspect of the present invention, a device includes an input interface and a processing device. The input interface is capable of receiving data related to at least one vector associated with a path taken by movement of a cursor on a web page prior to an advertisement on the web page being clicked by a controller of the cursor. The processing device detects a click fraud based on an analysis of the received data.

According to a further aspect of the present invention, a computer program product comprising a computer useable medium having computer useable program code embodied therewith, the computer useable program code comprising computer useable program code configured to receive data related to at least one vector associated with a path taken by movement of a cursor on a web page prior to an advertisement on the web page being clicked by a controller of the cursor, and computer useable program code configured to detect a click fraud based on an analysis of the received data.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
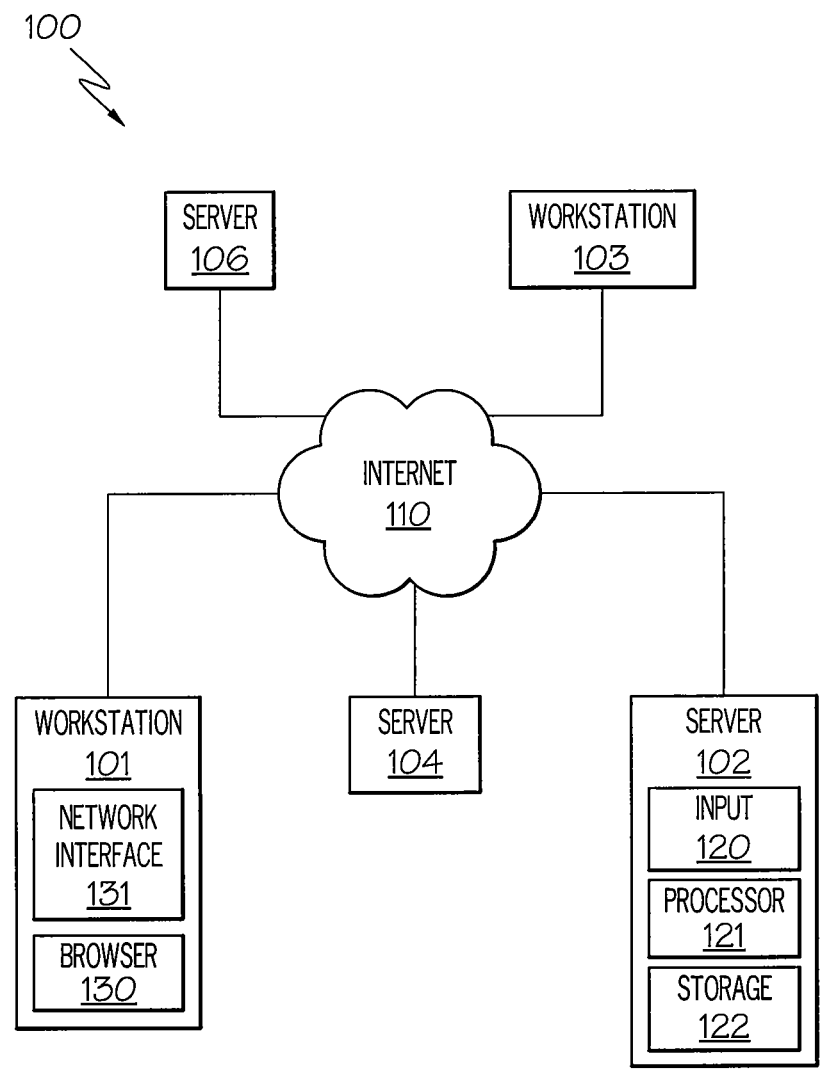
FIG. 1 is a diagram of a system for detecting click fraud according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention detect click fraud by using vector analyses/patterns from conventional systems' usage patterns that are difficult to generate in automated tools. Specifically, in embodiments according to the present invention, knowledge of the behaviors of how users use computer systems is taken advantage of. Embodiments according to the present invention map these behavior patterns to a set of individualistic vectors, and associate these vectors with a permission to motivate (i.e., process) the act of "click". The act of "click" is permitted when vector patterns are deemed to be from a human.

The use of automation tools (using general automation scripts as shown previously) for selecting a control on screen and initiating a click event have a side effect that is exploited in embodiments according to the present invention. A key limitation in the automation of the act of selecting a control on screen and initiating a click event comes at the cost of trying to precisely emulate manual user behavior. Using tools such as QAPartner, MSTest, Rational Performance Tester, Rational Functional Tester exposes this limitation. The limitation is with respect the sequence of prior events that are done manually, which are very difficult to emulate/automate.

Embodiments according to the present invention exploit the stochastic pattern in cursor movement vectors (e.g., those initiated by a pointing device such as a mouse) to establish that a human is involved, as opposed to an automated tool. When a user moves their mouse (thus moving the cursor) to a point on screen and motivates a click action there are a set of vectors established prior to click based on the trajectory that the cursor has taken to arrive at the control. Typically, the journey that the cursor (via mouse movements) will take to get from source to destination on a screen can be mapped to a set of sub-movement vectors. The set of vectors in turn relate to the journey that the cursor has taken to get from source to destination.

It is virtually impossible for a user to have a cursor on a source position (e.g., coordinates $X_S$, $Y_S$) and arrive at a destination position (e.g., coordinates $X_D$, $Y_D$) where the cursor has only traveled along one vector. To accommodate this, the user's cursor would have to perform the improbable task of traversing one single perfectly straight line on the screen from a source position to a destination position. In reality, there are multiple vectors involved as a cursor traverses across a screen from a source to a destination. These multiple vectors map to a set of shorter-distance straight lines from a source position to a destination position. A single vector is almost impossible to achieve by human movement.

Cursor movements are less about straight line movements, but generally involve more curved movements to arrive at a given point. Regardless, assuming the user makes as best an attempt as possible to arrive at a destination position on screen in a complete straight line they will likely have generated at least a few straight line vectors due to the distance between pixels on screen being hundredth's of a millimeter.

Embodiments according to the present invention exploit the stochastic pattern in cursor movement vectors to establish that a human is involved, as opposed to an automated tool. Accordingly, a confidence factor may be determined based on the analysis of the cursor movement. The confidence factor can be used to deny the action of click on an advertisement or other item on a web page. That is to allow a click only when cursor movement vector analyses has demonstrated a pattern as being consistent with a human, denoted by the act of clicking having an immediate prior history of a cursor having established a discernible set of movement vectors prior to click. In other embodiments the confidence factor may be used to recommend that a click be considered fraudulent while not withholding the click response.

As noted previously, some automation tools may use a very intelligent automation script that may attempt to force the cursor to traverse a set of vectors (as opposed to just being positioned at a button location) to click on a button or URI. Therefore, embodiments according to the present invention recognize that the vector patterns for one user are substantially different from that of another user. Specifically, the journey that a mouse of a User A takes from one position to another position with a control/URL on screen will implement a different set of cursor movement vectors when compared with the journey that a cursor of another User B takes. Further, repeated cursor movements of the same user (e.g., User A) will be different from each other. Moreover, different screen types, different movement styles, different start positions, different trajectories, different wrist positions will all map to individualistic user behaviors where the duplication of vector patterns between different users (or the same user) has a zero probability of occurrence.

Further, in embodiments according to the present invention, the vectors associated with a journey to initiate a click may be stored as a linked list of vectors on a server hosting the web page associated with the click action. These vectors may each be associated with a storage or hash code, where the hash can be decoded to provide at least some identifying information about the vector. The journey to initiate a click can then be represented as a sequence of hash codes. Subsequent clicks that implement analogous hash sequence patterns can then be dismissed as an automation tool attempting to simulate the actions of a user, as it would be extraordinarily difficult for an automation tool to implement code to derive unique and discernible user patterns that would map to an individualistic set of vectors.

Therefore, embodiments according to the present invention perform vector analyses prior to click actions, and pattern analyses for hash values associated with iterative clicks thus allowing for precision in establishing that a human is involved. This makes it difficult (actually impossible) for an automation tool to simulate a human controlling a mouse movement.

FIG. 1 shows a diagram of a system for cursor path vector analysis according to an example embodiment of the present invention. This system 100 may include one or more workstations 101, 103 and one or more servers 102, 104, 106 where each may be connected to a network 110, for example, the Internet. Each workstation includes a browser 130 that provides the capability to access a web page and prepare the web page for display on a screen, and a network interface 131 providing access to the network 110 for accessing the web page. Although not shown, the workstations 101, 103 may also include a processor, memory, one or more data input devices such as a keyboard and/or a pointing device such as a mouse, a display. Each server 102, 104, 106 may include one or more processors 121, one or more storage devices 122, and one or more input interface 120. Further, although not shown, the servers 102, 104, 106 may include a display, a network interface, and other items normally associated with a server. The processors may control activities as well as perform various types of processing. The input interface may be a device that receives data, receives keystrokes, receives portable storage devices, be a pointing device, or any other type device that provides input to the server. In addition, the workstations 101, 103 and the servers 102, 104, 106 may each be capable of receiving software instructions stored on a storage medium, (e.g., a compact disk (CD), diskette, tape, etc.), that may be inserted into the workstations 101, 103 and/or the servers 102, 104, 106. Each workstation 101, 103 and each server 102, 104, 106 may have the same cursor path vector processing capability. However, to illustrate the present invention, one workstation 101 and one server 102 will be discussed.

A company, publisher or other entity that manages a server 102 may host a website on the server 102 where the website provides content as well as advertisements for advertisers that pay the publisher to include clickable advertisements on the website of the publisher. The advertiser may pay the publisher for each "click through" which a visitor to the publisher's site (hosted by the server 102), generates. A visitor or user may access the website hosted by the server 102 via the network 110 using a workstation 101 or other computing type device. The workstation 101 may access the website hosted on the server 102 via a network 110 such as the Internet.

The server 102 generates and downloads the web page which may include markup that enables the cursor tracking and web page viewing duration timing. In the case of downloaded code (e.g., applets, activeX, Javascript, etc.) the server 102 may also serve this code for initial download. The actual timing, click detection, and cursor path vector processing may all be done in software code on the workstation 101 (i.e., client device), whether downloaded from the server 102 or natively built into the browser installed on the client device 101 or added to the browser by extension.

Moreover, the signature information for the clicks, the timings, and the transit info, may be sent from the workstation/client device 101 to a server 102, 104, 106 that will analyze this information and judge whether or not this was click fraud. The server 104, 106 or processing device performing the analysis may be a different server from the server 102 hosting the web page. This information may be sent via the hosting server 102 as an intermediary or it may be sent directly to the server 104, 106 performing the analysis. In embodiments according to the present invention, the hosting server 102 may be same as the server that judges.

A company, publisher or other entity that manages the server 102 may host a website on the server where the website provides content as well as advertisements for advertisers that pay the publisher to include clickable advertisements on the website of the publisher. The advertiser may pay the publisher for each "click through" which a visitor to the publisher's site (hosted by the server 102), generates. A visitor or user may access the website hosted by the server 102 via a network 103 using a workstation 101 or other computing type device. The workstation 101 may access the website hosted on the server 102 via a network such as the Internet.

The web pages displayed on the website hosted by the server 102 use cursor transit monitoring to prevent click fraud from occurring on advertisements displayed on the website. In this regard, the server tracks a path of a cursor movement (e.g., representing movements controlled by a pointing device, software, automated mechanisms, etc.) on the web page towards an advertisement. Based on an analysis of at least one vector associated with the path of the cursor movement, the server determines whether a click fraud is occurring or whether a clicking on the advertisement (ad) is in fact valid. If valid, a web page or information associated with clicking on the advertisement may be displayed and appropriate charges may be sent to the advertiser based on the clicking of the advertisement.

Figure 2:
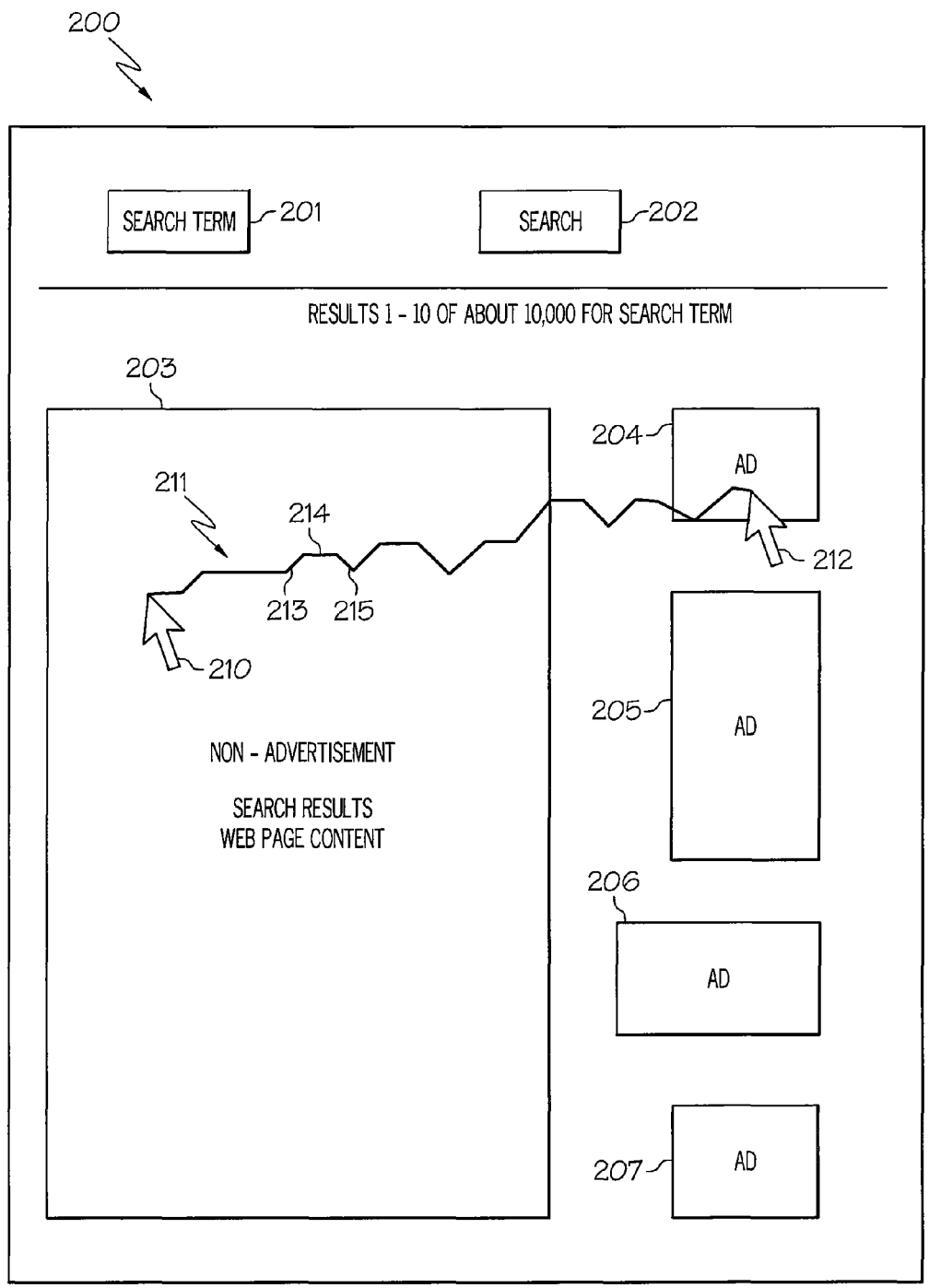
FIG. 2 is a diagram of a web page illustrating a human-like cursor movement according to an example embodiment of the present invention.

FIG. 2 shows a diagram of a web page illustrating a human-like cursor movement according to an example embodiment of the present invention. In this example embodiment, the web page 200 displays search results in a non-advertisement area 203 for a search term 201 that was entered by depressing a search button 202 on the web page 200. The web page 200 may also include one or more advertisements 204, 205, 206, 207 that display advertising information related to a product or a service of an advertiser. Embodiments according to the present invention track the movement of a cursor from a first position 210 along a path 211 to a second position 212 on an advertisement 204. The path traveled 211 by a cursor, which may be controlled by a pointing device such as a mouse, controlled by software, or an automation tool, may be mapped into one or more vectors that define the path 211 from the first position 210 to the location of the advertisement 212.

For illustration purposes, although multiple vectors exist, only a subset of these vectors has been labeled 213-215. In embodiments according to the present invention, a pattern may be analyzed in the vectors defining the path 211 to determine if the cursor movement is human-like. In this example embodiment, the path is composed of a plurality of vectors and therefore, an analysis of the vectors associated with the path of the cursor may determine that the cursor movement is human-like and a click fraud is not occurring. It would be virtually impossible for a human controlling a pointing device (e.g., a mouse), to move the cursor from the first position 210 over to the second position 212 over an advertisement 214 in a perfectly straight line where only one vector would exist. A path that includes a series of multiple vectors may be considered more of a human-like movement.

Figure 3:
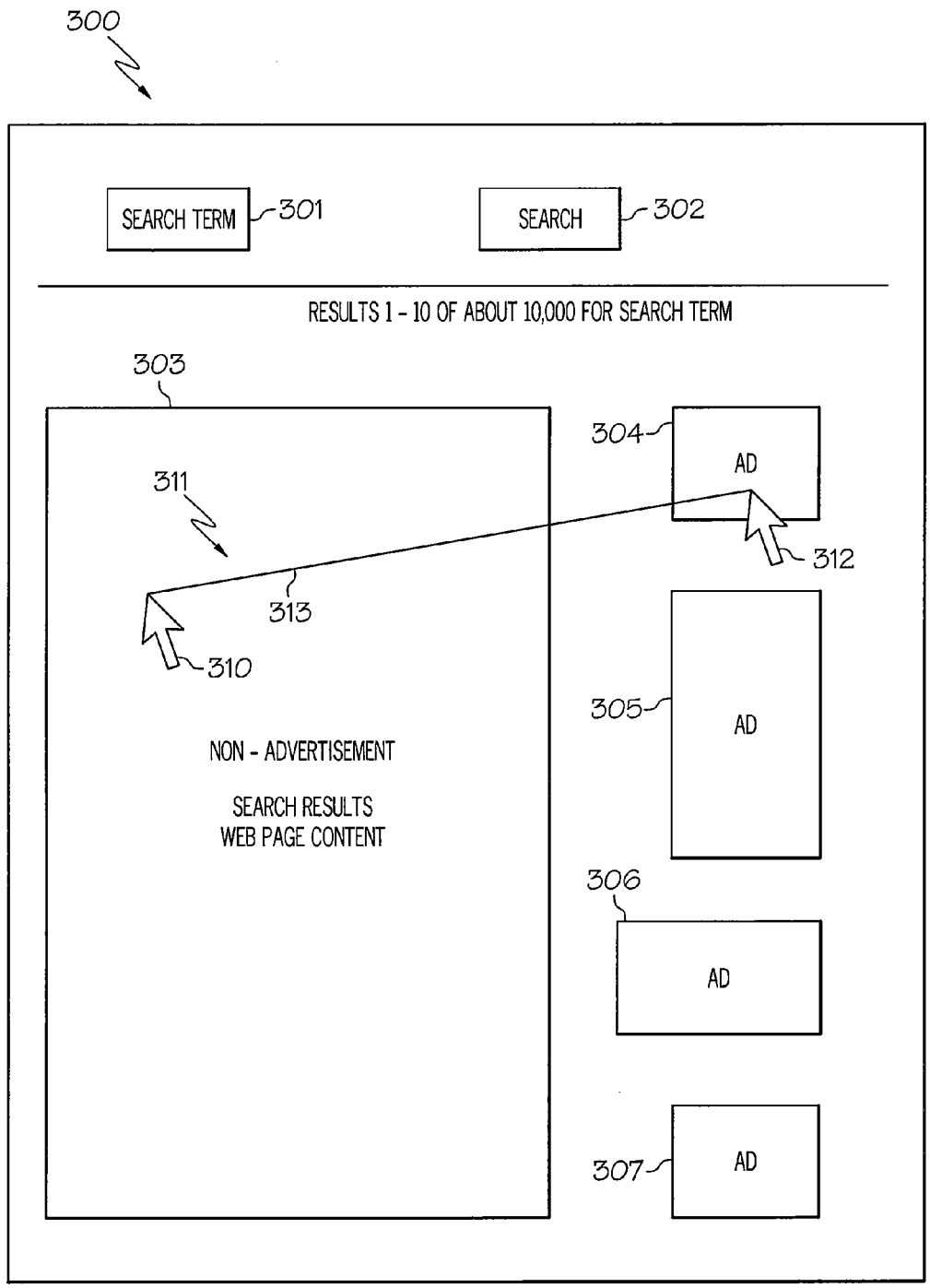
FIG. 3 is a diagram of a web page that illustrates a cursor movement resembling a click fraud according to an example embodiment of the present invention.

FIG. 3 shows a diagram of a web page that illustrates a cursor movement resembling a click fraud according to an example embodiment of the present invention. The web page 300 is similar to that shown in FIG. 2 in that it shows search results in a non-advertisement web page content area 303 from running a search term 301 by depressing a search button 302. Further, the web page 300 may include one or more advertisements 304-307 displayed in different areas on the web page 300. In this example embodiment, a cursor may be moved from a first position 310 to a second position 312 over one of the advertisements 304. The cursor is moved along a path 311. As can be seen in this example embodiment, the path 311 traversed by the cursor from the first position 310 to the position over the advertisement 312 follows a straight-line path that only includes one vector 313. A pattern in the one vector 313 may be analyzed to determine if the cursor movement is human-like. In this example embodiment, since it would be virtually impossible for a human using a pointing device or other device to move a cursor in a perfectly straight line, a click fraud would be detected after analyzing this cursor movement. This click fraud cursor movement may be generated by software in a computer or other processing device or via some automation tool. Thus, the click on the advertisement 304 would not be processed and an advertiser owning the advertisement 304 that has been clicked would not be billed for this click.

Figure 4:
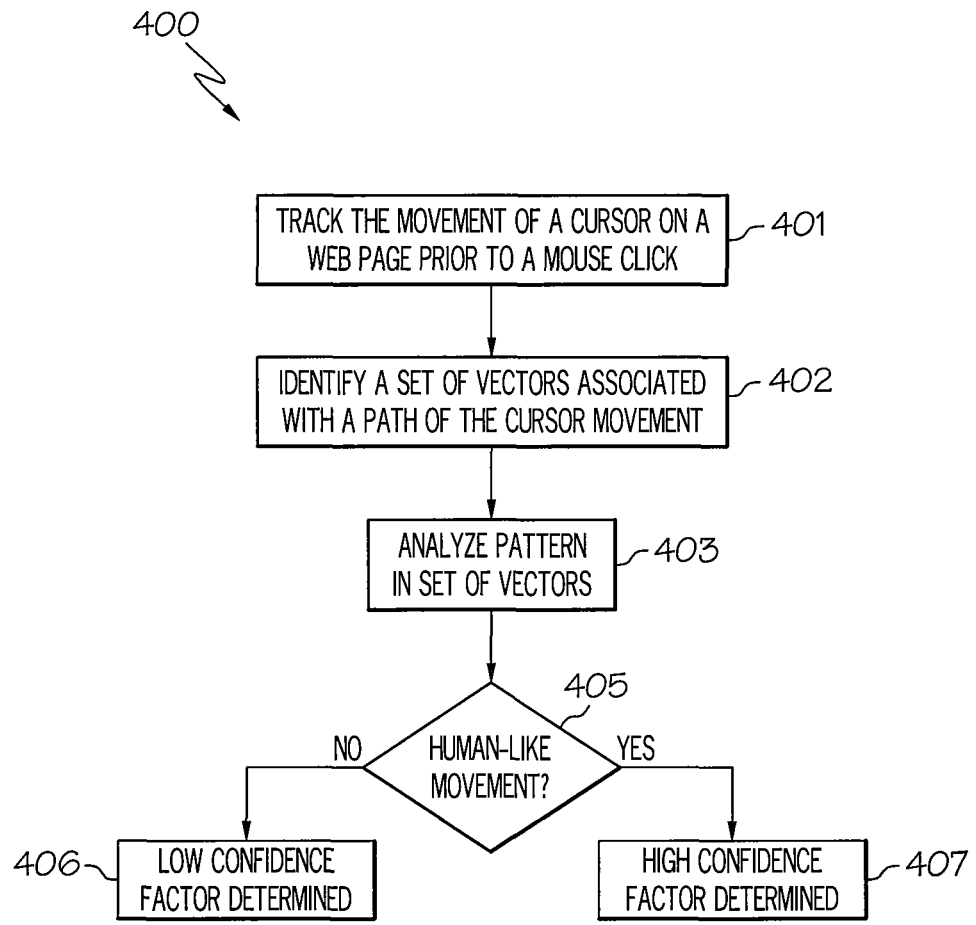
FIG. 4 is a flowchart of a process for detecting click fraud according to an example embodiment of the present invention.

FIG. 4 shows a flowchart of a process for detecting click fraud according to an example embodiment of the present invention. In this process 400, in block 401, the movement of a cursor on a web page is tracked prior to a controller of the cursor clicking on an advertisement on the web page. In block 402, a set of vectors associated with a path of the cursor movement is identified. In block 403, a pattern in the set of vectors is analyzed where each of the vectors may be analyzed in turn. Each vector may be individually scored, as well as a hash value generated. Responsive to the analysis, a confidence factor may be determined that is useable to identify whether click fraud has been attempted. Vectors may be compared to each other, and if it is determined that at least a subset of the vectors is algorithmically generated, a lower confidence factor may be determined. For example, if the vectors represent a consistent "zig-zag" with the vectors having slopes (e.g., angles) identical to other vectors, a lower confidence factor may be determined. A higher confidence factor may be generated if the individual vectors differ with some meaningful level of variability, e.g., represent a human-like pattern where the subset of vectors include multiple vectors having random and/or various slopes/angles. This may be a factor in the determination of whether the overall end-to-end trajectory of the cursor was generated by a human or a machine. Thus, the analysis may involve the comparison of all vectors to prove sufficient variability. Consistency between vectors would be deemed a human impossibility. Therefore, it may be assumed that a machine was involved in generating a repeat sequence or pattern, thus a click fraud attempt.

In block 405, it is then determined if the path of the cursor movement is a human-like movement, and if not, in block 406, a low confidence factor may be determined suggesting a possible click fraud attempt. In block 405, if the movement of the cursor along the path is determined to be human-like (e.g., subset of vectors with differing slopes/angles), in block 407, a high confidence factor may be determined suggesting no click fraud.

Figure 5:
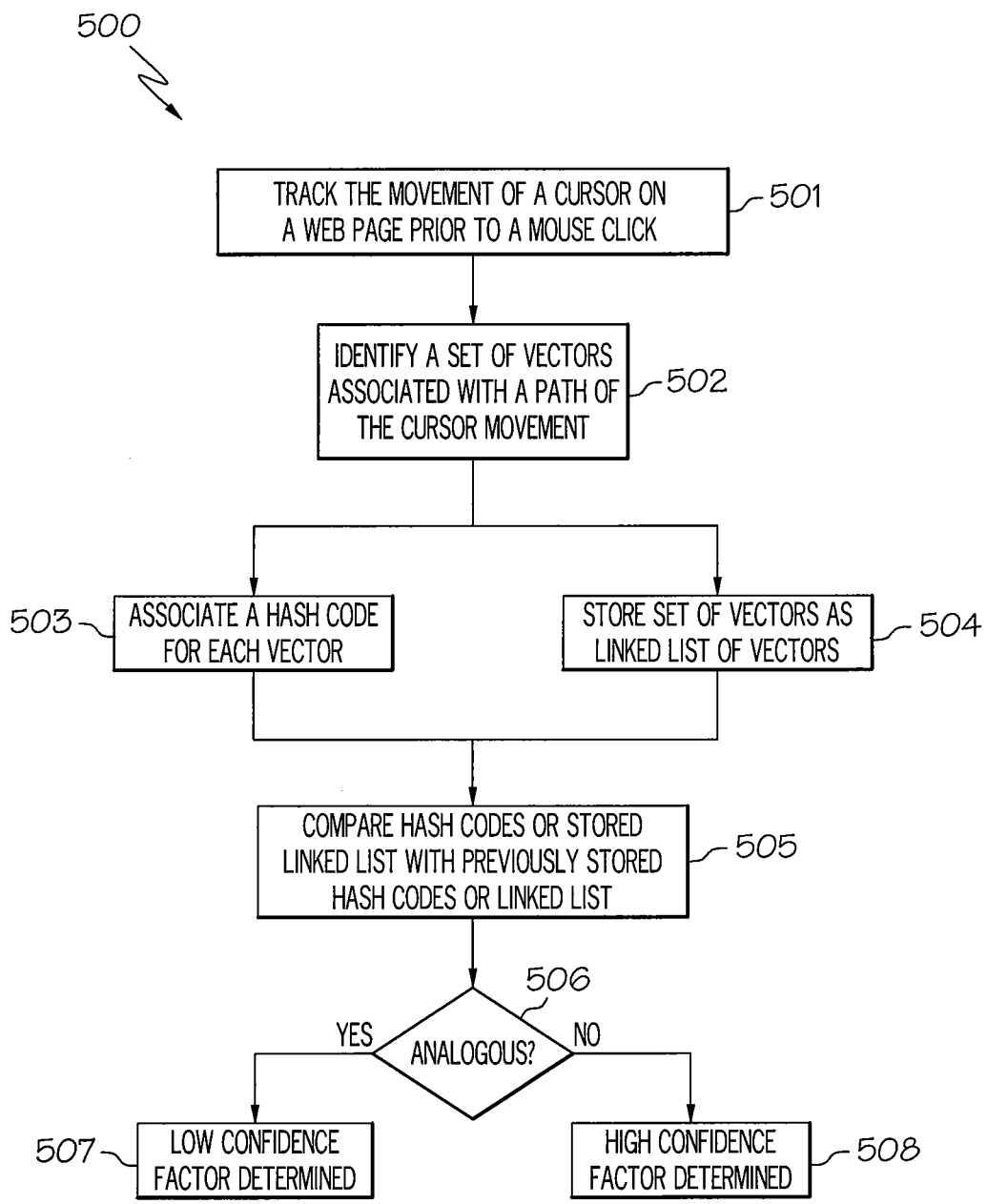
FIG. 5 is a flowchart of a process for detecting click fraud according to an example second embodiment of the present invention.

FIG. 5 shows a flowchart of a process for detecting click fraud according to an example second embodiment of the present invention. In this process, 500, in block 501, the movement of a cursor on the web page may be tracked prior to a controller of the cursor clicking on an advertisement. In block 502, a set of vectors associated with a path of the cursor movement may be identified. Further, in block 503, a hash code may be associated with each vector in the set of vectors. In block 504, the set of vectors may be stored as linked lists of vectors. In block 505, the hash codes and/or the stored linked list may be compared with previously stored hash codes or linked lists, respectively. In block 506, it may be determined if the two compared items are analogous (e.g., an analogous hash sequence pattern and/or an analogous linked list), and if so, in block 507, a low confidence level or factor may be determined, suggesting a possible a click fraud attempt. In block 506, if the sets of hash codes and/or the two linked lists are not analogous, in block 508, a high confidence level/factor may be determined, suggesting no click fraud. The click on the advertisement may be processed, and an associated web page or information related to the advertisement displayed, and the advertiser billed.

In one embodiment according to the present invention, the cursor movements may be normalized before comparison. An initial starting position may be mapped to a normalized initial starting position (e.g., (0,0)). Ending points, all within the advertisement, may also be mapped to a normalized terminating position, applying any necessary transforms to the path (e.g., stretching, compressing, etc.). Vectors may be analyzed only after the movement has been normalized. Here vectors may be deemed analogous to previously stored vectors if they have the same slope and overlap by a minimum number of pixels. The amount of the overlap may then affect the confidence factor.

Figure 6:
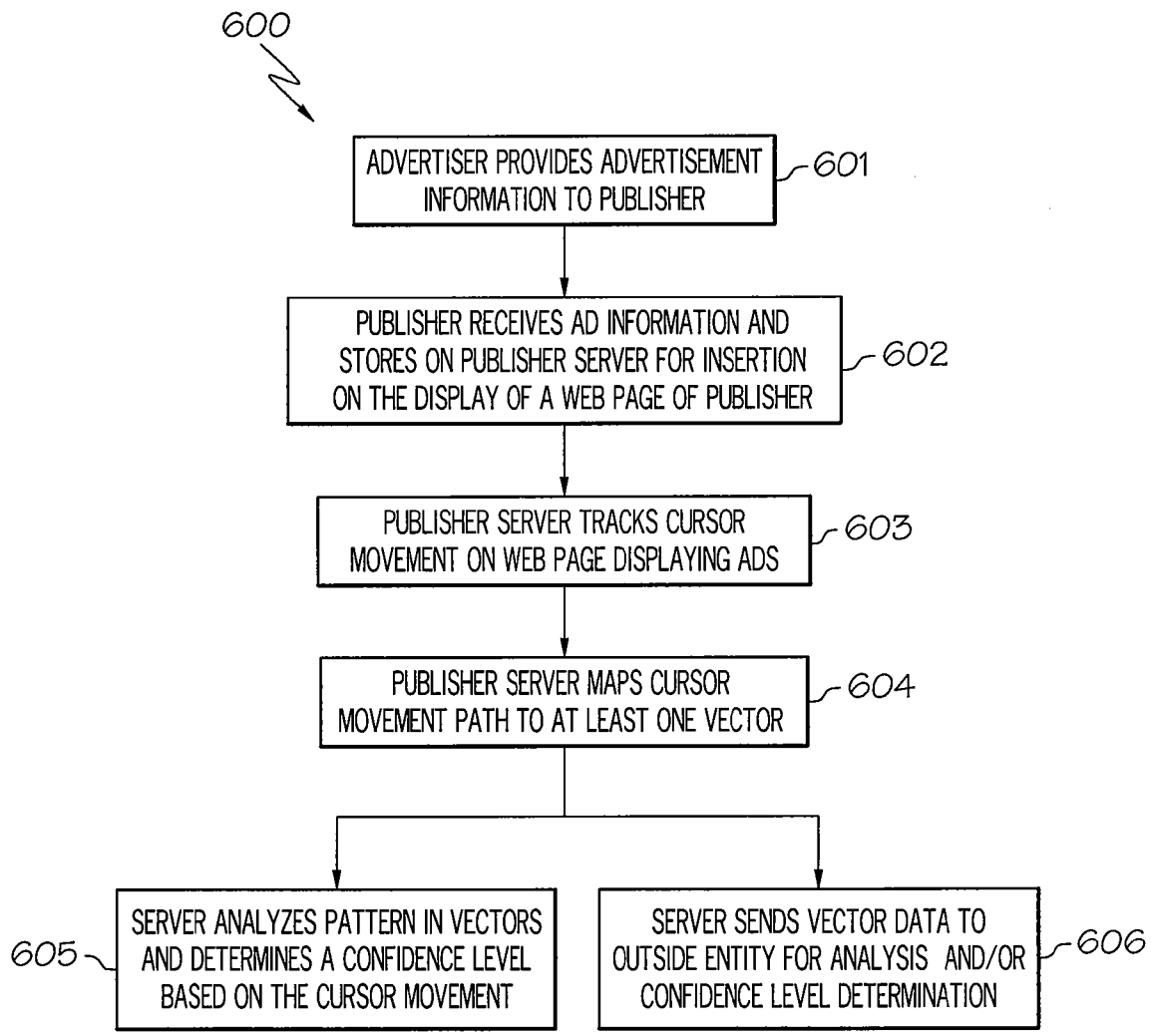
FIG. 6 is a flowchart of a process for detecting click fraud in a server according to an example embodiment of the present invention.

FIG. 6 shows a flowchart of a process for detecting click fraud in a server according to an example embodiment of the present invention. The process 600 includes in block 601, an advertiser may provide advertisement information to a publisher. In block 602, the publisher receives the advertisement information and may store the advertisement information on a publisher's server for insertion onto the display of a web page of the publisher. In block 603, the publisher's server tracks cursor movement on the web page displaying the advertisement from a source location to the advertisement displayed on the web page. In block 604, the publisher's server maps a path defined by the cursor movement to one or more vectors (vector data) that define the cursor movement on the web page from the source location to the advertisement on the web page. In block 605, the server may analyze a pattern in the set of vectors and determine a confidence level and/or if click fraud is occurring, or alternatively, in block 606, the server may collect the vector data and send the vector data to an outside entity for analysis and/or determination of a confidence level or a possible click fraud.

Figure 7:
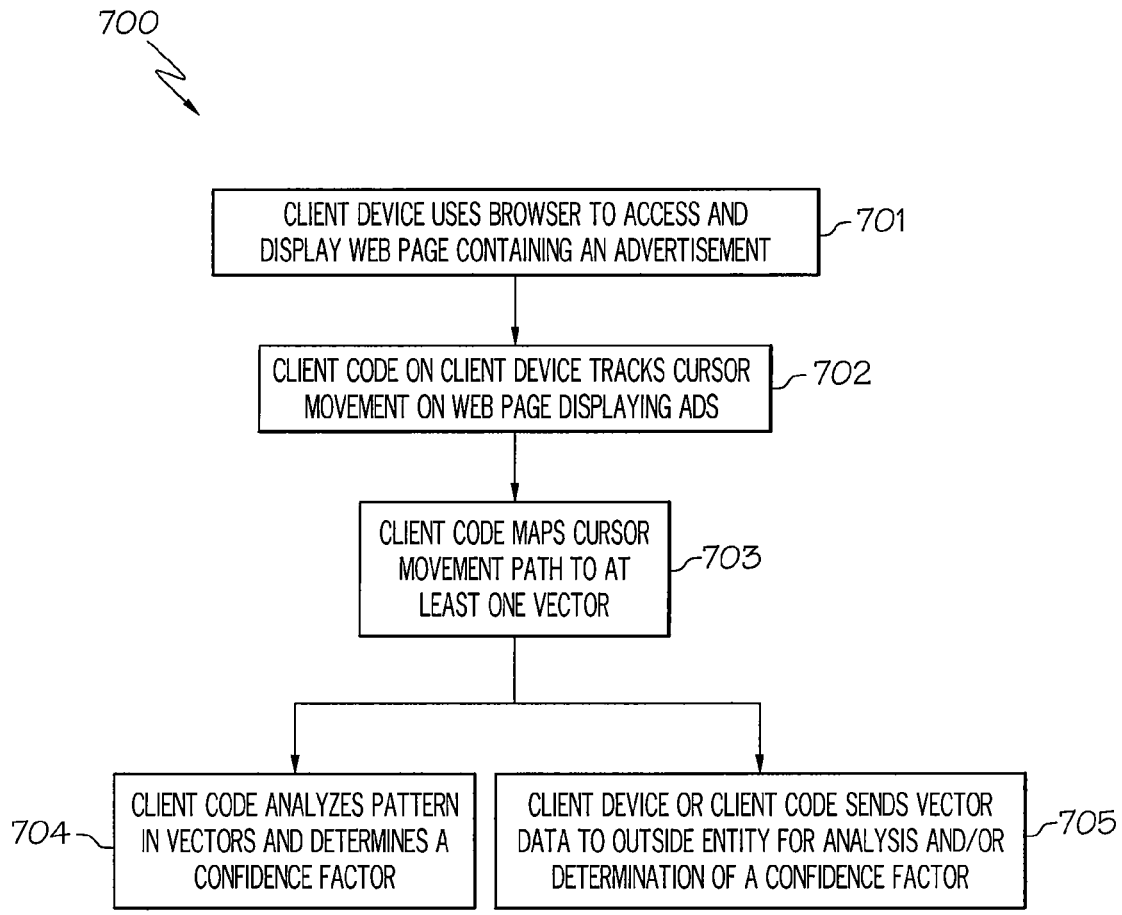
FIG. 7 is a flowchart of a process for detecting click fraud in a client device according to an example embodiment of the present invention.

FIG. 7 shows a flowchart of a process for detecting click fraud in a client device according to an example embodiment of the present invention. The process 700 includes in block 701, a client device uses a browser to access and display a web page containing an advertisement. In block 702, code or client code (e.g., browser code) installed on the client device may track cursor movement on the web page displaying the advertisement from a source location to the advertisement displayed on the web page. In block 703, the client code may map the cursor movement path to one or more vectors (vector data) that define the cursor movement on the web page from a source location to the advertisement on the web page. In block 704, the client code may analyze a pattern in the set of vectors and determine a confidence factor indicative of click fraud, or alternatively, in block 705, the client device or client code may send the vector data to an outside entity for analysis and/or determination of a confidence factor and/or possible click fraud. The code (client code) on the client device may be code integrated with a client browser, a separate plug in used for the browser, modifications to the operating system, a mouse device driver that works in concert with the browser, etc.

Figure 8:
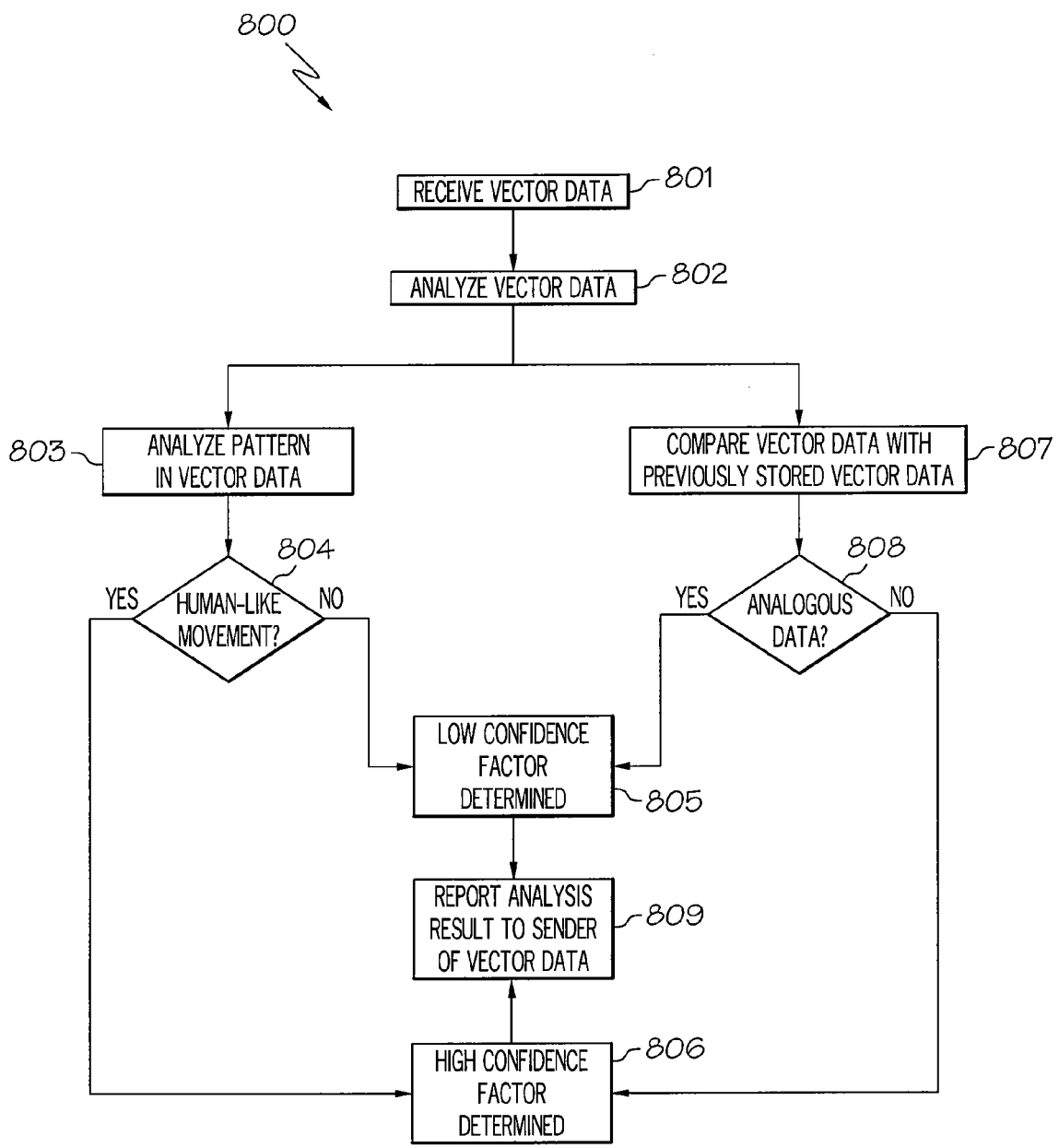
FIG. 8 is a flowchart of a process for analyzing click fraud according to an example embodiment of the present invention.

FIG. 8 shows a flowchart of a process for analyzing click fraud according to an example embodiment of the present invention. The process 800 includes in block 801, a processing device receives vector data. The vector data is related to a set of vectors that define a cursor movement on a web page from a source location to an advertisement on the web page. In block 802, the processing device analyzes the vector data. The analysis may include, as shown in block 803, analyzing a pattern in the set of vectors. In this regard, the processing device may analyze the pattern and, in block 804, determine if the pattern shows a human-like cursor movement (e.g., set of vectors defining the cursor path where the vectors have various different slopes and/or angles). If the analysis of the pattern shows the cursor movement to be a human-like cursor movement, in block 805, a high confidence factor may be determined, suggesting no click fraud. In contrast, if the analysis of the pattern shows the cursor movement to not relate to a human-like cursor movement, in block 806, a low confidence factor may be determined, suggesting a possible click fraud.

Moreover, in block 807, the processing device may perform an analysis that includes comparing the vector data with previously stored vector data and, in block 808, determine if the vector data and the previously stored vector data are analogous vector data. In block 805, if the vector data and the previously stored vector data are analogous vector data, a click fraud may be detected. In contrast, in block 806, if the vector data and the previously stored vector data are not analogous vector data, a result of the analysis may be that no click fraud is occurring. In block 809, the processing device may report an analysis result (e.g., a click fraud or no click fraud) to a sender of the vector data after the analysis is completed.

In embodiments according to the present invention, vector analysis allows a server to understand that the incoming client is using speech recognition or other automated mechanisms for manipulating the cursor using a mouse and keyboard. Moreover, by using vector analyses it is possible to extrapolate with reasonable confidence that the end user is being facilitated in manipulating their local GUI. In instances like this the server may respond with a more intelligent user interface and on screen assistance, for example, provide additional support, or indeed, different interfaces to those that are employing assistive devices, or whose vector pattern indicates difficulty in manipulating the mouse.

Embodiments according to the present invention may be used for other purposes. For example, identification of vector patterns associated with a user allow these patterns to be evaluated to determine if they match patterns known from particular assistive accommodations. When a pattern is identified, the server may choose to use the information to provide a different user interface, to provide targeted advertising, to capture different metrics, etc. For example, a financial site may have a mortgage calculator or the like, which requires entries to be made within a time period. Understanding that the user has difficulty may result in the site providing a click to call interface to a help desk.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for detecting click fraud comprising:
receiving data corresponding to a tracking of movement of a cursor on a web page prior to a click on an item on the web page;
associating the path of movement of the cursor with a set of vectors;
determining a confidence level useable in a determination of a possible click fraud attempt based on a level of variability of at least a slope between vectors of at least a subset of the set of vectors representing at least a portion of the path of movement of the cursor;
receiving the click on the item on the web page; and
denying the click in response to the confidence level being at a level indicating the possible click fraud attempt.

2. The method according to claim 1, further comprising determining a confidence level corresponding to there not being the possible click fraud attempt based on the variability of at least the slope between the vectors of at least the subset of vectors representing human-like manipulations of a controller of the cursor, the human like manipulations corresponding to the subset of vectors comprising multiple vectors having randomly different slopes.

3. The method according to claim 1, further comprising determining a confidence level corresponding to there being the possible click fraud attempt in response to consistency existing between any of the vectors of at least the subset vectors.

4. The method according to claim 1, further comprising determining a confidence factor indicative of the possible click fraud attempt in response to the path of the movement of the cursor defining a straight line.

5. The method according to claim 1, further comprising comparing the subset of vectors with previously stored vectors associated with the cursor movement to determine the level of variability of at least the slope of the subset of vectors.

6. The method according to claim 5, further comprising providing a confidence factor indicative of the possible click fraud if attempt in response to the comparison resulting in a match.

7. The method according to claim 5, further comprising providing a confidence factor indicative of the possible click fraud attempt when at least one of the subset of vectors differs from at least one of the previously stored vectors associated with a cursor movement by only at least one of a starting point of at least one of the previously stored vectors or a length of at least one of the previously stored vectors.

8. The method according to claim 1, further comprising generating by a server a hash code for each vector of the set of vectors associated with the path defined by the movement of the cursor, storing by the server each generated hash code as a hash sequence, and comparing by the server the stored hash sequence with previously stored hash sequences, a result of the comparison being useable to determine the possible click fraud attempt.

9. The method according to claim 8, further comprising determining if the stored hash sequence is analogous to at least one of the previously stored hash sequences.

10. A server comprising:
a storage device, the storage device hosting a web page containing an advertisement; and a processing device, the processing device controlling:
receiving data corresponding to a tracking of at least a portion of a path of movement of a cursor on a web page prior to a click on an item on the web page;
associating the path of movement of the cursor with a set of vectors;
determining a confidence level useable in detecting a possible click fraud attempt based on a level of variability of at least a slope between vectors of at least a subset of the set of vectors representing at least a portion of the path of movement of the cursor;
receiving the click on the item on the web page; and
denying the click in response to the confidence level being at a level indicating the possible click fraud attempt.

11. The server according to claim 10, wherein the server stores the set of vectors associated with the path of movement of the cursor and compares at least the subset of vectors with previously stored vectors, a result of the comparison being useable to detect the possible click fraud attempt.

12. The server according to claim 11, wherein the server detects a the possible click fraud attempt in response to the subset of vectors is being analogous to at least one of the previously stored vectors.

13. The server according to claim 10, wherein the processor generates a hash code for each vector of the set of vectors associated with a the path of movement of the cursor, stores each generated hash code as a hash sequence associated with the path, and compares the stored hash sequence with previously stored hash sequences, a result of the comparison being useable to detect the possible click fraud attempt.

14. The server according to claim 13, wherein the server detects the possible click fraud attempt if the stored hash sequence is analogous to at least one of the previously stored hash sequences.

15. A computer program product comprising a non-transitory computer useable storage medium having computer useable program code embodied therewith, the computer useable program code comprising:
computer useable program code configured to receive data corresponding to a tracking of movement of a cursor on a web page prior to a click on an item on the web page;
computer useable program code configured to associate the path of movement of the cursor with a set of vectors;
computer useable program code configured to determine a confidence level useable in a determination of a possible click fraud attempt based on a level of variability of at least a slope between vectors of at least a subset of the set of vectors representing at least a portion of the path of movement of the cursor;
computer useable program code configured to receive the click on the item on the web page; and
computer useable program code configured to deny the click in response to the confidence level being at a level indicating the possible click fraud attempt.

16. The computer program product according to claim 15, further comprising computer useable program code configured to:
store the set of vectors associated with the path of movement of the cursor;
compare at least the subset of the stored set of vectors with previously stored vectors; and
detect the possible click fraud attempt in response to the subset of the stored vectors being analogous to at least one of the previously stored vectors.

17. The computer program product according to claim 15, further comprising computer useable program code configured to generate a hash code for each vector of the set of vectors associated with the path of movement of the cursor, store each generated hash code as a hash sequence, compare the stored hash sequence with previously stored hash sequences, and detect the possible click fraud attempt in response to if the stored hash sequence is being analogous to at least one of the previously stored hash sequences.

18. The method of claim 1, further comprising:
normalizing the path of movement of the cursor;
comparing at least the subset of vectors to previously stored vectors of cursor movement;
determining the subset of vectors to be analogous to the previously stored vectors in response to the subset of vectors and the previously stored vectors overlapping by a set minimum number of pixels; and
determining the confidence level based on an overlap between the subset of vectors and the previously stored vectors.

* * * * *